US005256190A

United States Patent [19]

Barth

[11] Patent Number: 5,256,190

[45] Date of Patent: Oct. 26, 1993

[54] UNIVERSAL CHEMICAL SYSTEM FOR OFFSET PRINTING

[76] Inventor: Thomas M. Barth, 109 Chiroc Rd., Hendersonville, Tenn. 37075

[21] Appl. No.: 852,289

[22] Filed: Mar. 16, 1992

[51] Int. Cl.[5] .......................... C09K 3/18; B41N 31/08

[52] U.S. Cl. .......................................... 106/2; 101/451; 101/148; 101/465; 101/466

[58] Field of Search .................... 106/2; 101/451, 148, 101/465, 466

[56] References Cited

U.S. PATENT DOCUMENTS

| | | | |
|---|---|---|---|
| 4,030,417 | 6/1977 | Lipovac | 106/2 |
| 4,238,279 | 12/1980 | Tsubai et al. | 106/2 |
| 4,748,098 | 5/1988 | Schell | 106/2 |
| 4,764,213 | 8/1988 | Gventer | 106/25 |
| 4,798,627 | 1/1989 | Schmitt et al. | 106/14.14 |

*Primary Examiner*—Helene Klemanski
*Attorney, Agent, or Firm*—Edward D. Lanquist, Jr.; Mark J. Patterson; I. C. Waddey, Jr.

[57] ABSTRACT

The present invention discloses a universal chemical system for offset printing comprising a plate coating, a fountain concentrate solution, an alcohol replacement solution, a roller coating, and a plate wash. The system uses the same types of chemicals throughout to achieve a system compatible throughout. The plate coating comprises deionized water, citric acid, sodium phosphate dibasic, gum arabic, magnesium nitrate solution, glycerine, and propyl alcohol. The fountain concentrate solution contains water, citric acid, sodium citrate, sodium phosphate dibasic, sodium benzoate, gum arabic, glycerine, ethyl hexandiol, and erio green B supra. The alcohol replacement solution contains deionized water, diethylene glycol, propasol P, glycerine, and dowanol PM. The roller coating contains deionized water, citric acid, disodium phosphate, gum arabic, glycerine, and propyl alcohol. The plate wash contains water, citric acid, dowanol EB, dowanol PM, maphos 8135, phosphoric acid, and erio glaucine a supra.

7 Claims, No Drawings

UNIVERSAL CHEMICAL SYSTEM FOR OFFSET PRINTING

BACKGROUND OF THE INVENTION

In the past, every chemical that has been designed for use in the graphic arts offset printing industry, was created to do a specific job. However, chemicals were not designed to support other chemicals used in conjunction with the printing press. When the graphic arts industry and its chemical producers were forced to change to a cleaner, lower volatile organic compounds (V.O.C.) product line, the chosen chemicals were actually in many respects incompatible and were interfering with the functioning of each another thereby, losing the objective of offset printing.

The first objective of chemicals in offset printing is to assist in and enhance the use of water to protect the non-image area of a printing plate. Water alone does not have this capability because of the abrasions that occur in the printing process on the metal used to carry the ink to the paper. When wear takes place, the metal must be recoated with a hydrophilic surface to allow the water to be attracted to the non-image area and not allow the ink to adhere first. In the printing industry, this is referred to as etching and counter-etching of the non-image area.

The chemical companies prior art approach to this problem was to use an acid and a hydrophilic substance (gum arabic), along with a salt to emulsify the acid and gum to be carried in the water to perform the counter-etch procedure. This product is referred to as "etch" or, more widely, as a "fountain solution". Regardless of the type of acid or salt being used, the industry has based the amount of acid in the water on a pH reading to achieve a level of acid in the water that is strong enough to turn the gum arabic into an acidity sufficient to adhere to the non-image area. The concern is that if the pH is not below 4.5, the gum arabic will not perform in adhering to the plate, and if the pH reading is below 3.5, the acid will overpower the gum and will not allow the gum to adhere.

In almost every prior art use of a fountain solution, the amount of gum arabic in the formula will not exceed 1.0 to 1.5 ounces of gum per gallon of water used on a printing press. The reason for this mixture is that there reaches a point where gum arabic is so prevalent in a solution that, depending on the pH reading of the water, it will reach an uncontrollable state and will create unwelcome results in other areas on the printing press.

When the printing industry introduced better mechanical devices to improve the distribution of water to a printing plate, there became a need for a wetting agent to be added to the water to increase its flow and wetability. Isopropyl alcohol (IPA) was used to reduce the surface tension of water and also aid in the cleaning of the surface of the plate with a high evaporation solvent-based chemical. Unfortunately, by using IPA, the printer increased by approximately 50% or more the V.O.C. consumption and also created highly flammable chemistry. Also, there are other undesirable side effects inherent in chemicals using alcohol. Because of its highly volatile nature along with its extremely quick evaporation rate, alcohol made printing plants a larger producer of volatile organic compounds (V.O.C.) that enter into the atmosphere. Further, alcohol has a tendency to mix other chemicals of an alien nature into harmonizing water. Alcohol tended to break down the ink which can cause major incompatibilities. Further, the addition of other types of chemicals used in the printing process caused the interruption of chemical performance and interruption of performance of substitutes.

When the printing industry was required to use chemicals which produced lower levels of V.O.C. into the atmosphere and which were less dangerous to employees, the chemical industry decided to substitute chemicals to have the same characteristics as one chemical with several different chemicals of a lower V.O.C. readout and a lower volume usage. Alcohol is an absolute chemical and allows tremendous latitude because of the effects it has with its dosages and its capability of blending other chemicals together. The chemical companies also focused on the replacement of alcohol, really not paying any attention to the effects the other chemicals were having on the printing press and what effect alcohol was having in the grand scheme of things. By still using the same formulas incorporating acid, salt, and gum arabic, they only created a fourth chemical rather than looking at the effects of their past chemicals and how solvents based on glycol and surfactants would affect acid, gum, and salts.

Because there are other chemicals regularly used in a printing press, how these substitute chemicals affect the performance of acid, gum, and salts, must be considered. If any particular chemical interrupts the etching process of the printing plate created by the acid, gum, or salt, the process is broken and the performance ruined.

In the past, the art has only looked at one chemical at a time and never looked at other chemicals that were being used and created. Therefore, no consideration was given to how each of the chemicals used in the process were or were not supporting or interfering with the functioning of another. For example, alcohol was only one among several chemicals used in the printing process, but it has the capability of blending and mildly overpowering the other chemicals that enter the water system.

In typical past usage, there have been eleven categories of chemicals used in an offset press: (1) fountain solution; (2) additives or replacements for alcohol; (3) plate cleaners; (4) roller washes; (5) blanket washes; (6) chrome roller cleaners; (7) metering roller cleaners; (8) storage gum; (9) roller deglazers; (10) blanket conditioners; and (11) anti-skin spray for the ink. In the past, each of these categories is been formulated independently with specific chemicals designed to do a specific job, with little or no regard to compatibility or joint functionality.

Fountain solutions usually comprise an acid base, desensitizing salts, and gum arabic and are intended to counter-etch the non-image area of a printing plate. This causes normal fountain solutions to accelerate a chemical reaction of low level bonding at a more frequent rate. This is why many fountain solutions work better in some areas than in others because they depend on the types of salts and acids that are incorporated. Further, the surface may not accept the lower level of etching of certain types of acids and salts that are not compatible with its chemical makeup. In most cases, the fountain solution replacements are designed having a counter-etching formula and a replacement for alcohol which have a solvent subtracting base which are extremely vulnerable to failure. Ink is very sensitive to solvents and acid and once a chemical is pushed beyond the balance of the water and ink, the ink's identity is destroyed.

Alcohol replacements are designed to reduce surface tension of the water and most are solvent-based to specifically remove ink from the non-image area.

All plate cleaners are designed for maintenance of the off-set printing plate. Plate cleaners are used to remove oxidation, desensitize the non-image area for scratches, and to replace any hydrophilic chemicals on the non-image area of the offset plate. Most plate cleaners are made of acids, desensitizing salts, gum arabics, and surfactants. The off-set printing plate contains a light film of hydrophilic chemical. During use, the non-image area is vulnerable to being scratched or oxidized. Further, the film can be exposed to grease or oxidation. Either of these factors can interrupt the process. The performance of a printing plate is determined in the non-image area, which carries water, and in the image-area, which carries ink. When the non-image area is scratched or oxidized, the ink begins to adhere to the areas that are to remain clean of ink. In most cases, the chemicals in the water solution which are to maintain this balance are not strong enough to etch and to replace the hydrophilic surface in the problem area. A very strong chemical must be used to restore the plate to its original condition. In the past, printers have approached this problem with the theory of a single type of solution to resolve the entire problem. These cleaners are made with an acid base along with several desensitizing solvents in a surfactant or mild solvent. These are inadequate because the chemicals in the cleaner are most likely different from those in the water solution. The cleaner that was applied is not supportive of the water and thereby causes the cleaner coating to be worn off or powered away, thereby exposing the problem area. Repeated attempts to desensitize the area actually worsened the problem by reducing the effect and completely destroying the normal function of the etching chemicals.

Roller washers are designed to remove ink from the inker units on an off-set press. Roller washes have a solvent base which are made to break down and flush resins from the surface to which they are bonded.

The purpose of roller and blanket washes is to remove ink from any and all areas of the printing press. The problem with the typical prior art wash is that they sometimes have the same type of surfactants that are present in the developer used on an offset printing plate. This creates a fine residue of wash remaining on the ink rollers after a wash up. When the press is re-inked and begins to produce the residue, it leeches out of the ink and onto the printing plate. The fine residue causes the plate to react to the solvents and to continue to develop and to interfere with the balance of ink and water. Consequently, the plate begins to take ink in the non-imaging area. Further, the blanket wash is used on the plate to clean dirt and unwanted particles from the surface. This creates the small amounts of blanket wash beginning to appear in the wash unit from the result of mixing with water on the printing plate. Again, the balance is interrupted because the chemicals are not compatible with the water and therefore interrupt the chemical balance.

Chrome roller cleaners are designed to remove oxidation metals that would form on the chrome water distribution rollers in an offset printing press. When the rollers are cleaned, then it is up to the pressman to apply a layer of eight degrees to fourteen degrees of baume gum to the rollers, to try to make them repel ink from the roller. When the ink adheres to the chrome roller, the it cannot distribute the proper amount of water to the other rollers in the water unit.

Metering roller cleaners were designed to remove ink build-up on the metering roller in the water unit of the printing press. The metering roller is used to squeeze the water off the chrome water pan roller. By adjusting the metering roller, one is able to control the proper flow of water. When the ink adheres to the chrome water roller, it is then transferred to the rubber metering roller. As a result the control of water is interrupted and becomes more difficult. In the printing industry, this is referred to as a "feedback". When the metering roller is loaded up with ink, the metering roller cleaner is used to remove the ink.

Blanket washes are designed to remove ink and particles from the off-set blanket on a printing press and to perform some revitalization of the rubber.

Storage gums were designed to protect a printing plate when stored for reuse in for reprinting of a specific job. The protection of the plate is to insure that the non-image area remains hydrophilic.

Blanket conditioners were designed to remove glaze that would form over a period of time on a press blanket, from the fountain solution blending with the residue of paper coating. Blanket conditioners were also intended to attempt to replace the plasticizers in the blanket that would be removed by numerous applications of blanket washes.

Anti-skin sprays for ink were designed to prevent ink from oxidizing or forming a dry layer of ink in the ink fountain of an offset printing press. The anti-skin spray was also used to retard the drawing of ink which occurs in the ink roller.

When chemicals are present on a printing press and are applied to a particular area to cure a problem or perform a major function in production, at some point, they must interfere with each other. Chemical molecules will remain on the printing press until they are physically removed. If they are not removed by human hands, they will be carried from the press to the printed material. In the printed material, the molecules will either be consumed by the ink and transferred to the paper by the off-set blanket, or be consumed by the water and blended into the ink to be transmitted from the non-image area of the plate to the blanket and then to the paper. But regardless, the chemical molecules are interfacing with a carrier, whether the ink or water. A trace of these molecules will show up somewhere and if the chemicals do not work compatibly or complement each other, there will be a failure.

Accordingly, what is needed is a universal chemical system for offset printing which is allows chemical products in the printing press to support each other and enhance each others performance. This needed system must allow the chemical washes, additives, and cleaners to support each other as they are used to perform their separate tasks but not interfere with one another when they come into contact in various parts of the procedure. Further, this chemical system must not produce unsafe levels of V.O.C.'s in the press room or add to the expense of the process.

SUMMARY OF THE INVENTION

The present universal chemical system for offset art printing is based on a family of chemicals designed to work together and complement and enhance each other in all areas of the press. Each product of the system is made from like chemicals which support each other and function in a manner similar to the other products of the system. To accomplish this, each of the various product compounds used in the present system formulated from gum arabic and glycerine, in novel ranges which enhance inter-functionality. A coating of glycerine and gum arabic is transmitted to the plate in water.

DESCRIPTION OF THE PREFERRED EMBODIMENT

The universal system of the present invention comprises a plate coating, fountain concentrate, an alcohol replacement, a roller coating, plate wash, and a compensator solution.

The fountain solution part of the system starts with a unique blend of glycerine and gum arabic that forms a completely new surface coating that adheres to the non-image area of the offset plate. This allows the plate to perform beyond its normal capability. The glycerine and gum arabic coat adheres to the non-image area in such a way that it draws and holds more water than the normal prior art fountain solutions.

The alcohol replacement portion of the system reduces surface tension of water molecules containing the fountain solution prior to coating the plate before grease and other unwanted materials bond to the plate. This enables the fountain solution to coat the plate without interference from foreign chemicals.

The other solutions work together to clean, desensitize and repair the surface of the non-image area of the plate. Because the plate wash has the same solvent base as other component solutions of the system, it removes the resin and metal deposits from the surface. Using the same types of desensitizing salts and acids present in the fountain concentrate enables the plate to accept the ingredients of the glycerine and gum arabic coat. By applying a coating to the prepared surface with the plate coating solution, the repaired surface comprises essentially the same chemicals used in the coating that takes place with the water solution. Therefore, the maintenance chemicals are supported by the chemicals used in water. If the plate wash or plate coating enter into the water from over usage, they do not interrupt the water chemistry but actually enhance it.

The roller coating and plate wash components of the universal system use the same solvents which are used throughout the system. They remove all the oxidation material on the chrome surface to prepare the metal for the roller coating. After the chrome is cleaned, the roller coating is applied to the chrome rollers. When this glycerine/gum arabic coat film adheres to the chrome, it creates a new surface that makes the chrome roller perform at a higher level than before. Because the roller coating uses the same chemicals as other portions of the system, it is replaced on a constant basis while the water flows through the water unit and continues to replace any surface that may be removed from a breakdown. Because the chrome rollers are being treated just as the metal of the printing press plate, there is a consistent and perpetual coating being applied which the printing press is producing. There is no longer a concern for feedback to the rubber metering roller because it is not capable of adhering to any metal roller. This then eliminates the need for metering roller cleaners.

The plate wash used in the present universal system interfaces with the chemicals in the water tank. The plate wash has no surfactants and has the proper solvents to prevent a residue from forming after usage. The plate wash is designed to be completely soluble in water and will not, when entering the water, destroy the balance. Instead, it will actually enhance the chemicals and fortify their roles.

The ratio of gum arabic to glycerine is critical in order to achieve the proper coating of the printing plate. The glycerine must be stronger than the gum by a range of 18–45 percent. In the preferred embodiment, glycerine is 23–27% more concentrated than the gum arabic. To achieve this in the preferred embodiment, glycerine is more concentrated that gum arabic by 0.41 to 1 ounces.

The solvent percentage of the formula is based on the water and mechanical conditions which can deviate from press to press and from printer to printer. The proportion of the coating solvent is dependent on the amount of glycol needed to effectively transmit the water to the plate. In some circumstances the mechanical part of the water system may be neglected, such as where the roller that transfers the water may be worn or out of specification range. By adding glycol, the water surface tension is reduced and a solvent-based water to be absorbed by the coating to maximize performance of the non-image area is created. In the worse case scenario, the solvents dissolved in the water may have to aid the coating to protect the non-image area by not allowing the imperfection from the ink to adhere to the coating.

In the preferred embodiment, the volume of solvents in ounces in a gallon of water must be in the range of a low of 1.37 to a high of 4.426 ounces to replace alcohol. Thus in a preferred embodiment, 2.78 fluid ounces of solvent is used per gallon of water. This solvent can consist of any glycol for the purpose of reducing surface tension of the water. In the preferred embodiment, the minimum coating in ounces to a gallon of water is 2.3149 whereas the maximum is 5.55. In a preferred embodiment, 4.76 ounces of coating is used to one gallon of water.

To make a preferred embodiment of the alcohol replacement solution, the following percentages of chemicals are used:

| CHEMICAL | POUNDS | OUNCES |
|---|---|---|
| DEIONIZED WATER | 106 | 1 |
| DIETHYLENE GLYCOL | 81 | 2 |
| GLYCOL (such as PROPASOL p) | 52 | 12 |
| GLYCERINE | 152 | 12 |
| PROPYLENE GLYCOL METHYL ETHER (such as DOWANOL PM) | 101 | 6 |
| NEOLAN YELLOW DYE | | * |

*1.36 grams

To make a preferred embodiment of the fountain concentrate, the following chemicals and percentages are used:

| CHEMICAL | POUNDS | OUNCES |
|---|---|---|
| WATER (120.3 GALLONS) | 1001 | 1 |
| CITRIC ACID | 31 | 10 |
| SODIUM CITRATE | 31 | 10 |
| DISODIUM PHOSPHATE | 3 | 6 |
| SODIUM BENZOATE | 4 | 8 |
| Dissolve, then add: | | |
| 14 Be' GUM ARABIC (110.2 GALLONS) | 1015 | 0 |
| GLYCERINE | 657 | 14 |

-continued

| CHEMICAL | POUNDS | OUNCES |
|---|---|---|
| 2-ETHYL-1,3-HEXANEDIOL | 4 | 8 |
| SURFACTANT (such as MAPHOS 8135) | 4 | 8 |
| ERIO GREEN B SUPRA Dye | * | |

*4.88 grams

To make a complete solution the following percent by weight is used:

| CHEMICAL | POUNDS | OUNCES |
|---|---|---|
| DEIONIZED WATER (63.4 gallons) | 527 | 13 |
| CITRIC ACID | 12 | 10 |
| SODIUM CITRATE | 12 | 10 |
| DISODIUM PHOSPHATE | 1 | 6 |
| SODIUM BENZOATE | 1 | 9 |
| Dissolve solids then add: | | |
| 14 Be' GUM ARABIC (37.7 gallons) | 346 | 15 |
| GLYCERINE 96% TECH GRADE | 498 | 5 |
| 2-ETHYL-1,3-HEXANEDIOL | 1 | 9 |
| MAPHOS 8135 | 1 | 13 |
| DIETHYLENE GLYCOL | 145 | 3 |
| PROPASOL P | 94 | 7 |
| Next, slowly add into the vortex of the mixing solution: | | |
| DOWANOL PM | 181 | 7 |
| ERIO GREEN B SUPRA | * | |

*1.68 grams

The compensator solution is produced by mixing:

| CHEMICAL | POUNDS | OUNCES |
|---|---|---|
| DEIONIZED WATER (20.6 gallons) | 171 | 2 |
| PROPYLENE GLYCOL | 66 | 8 |
| DOWANOL PM | 59 | 0 |
| PROPASOL P | 113 | 11 |
| NEOLAN YELLOW Dye | * | |

*1.13 grams

The roller coating of the present invention is produced by mixing:

| CHEMICAL | POUNDS | OUNCES |
|---|---|---|
| DEIONIZED WATER (100.1 gallons) | 832 | 11 |
| CITRIC ACID | 101 | 5 |
| DiSODIUM PHOSPHATE | 144 | 12 |
| Dissolve, then add: | | |
| 14 Be' GUM ARABIC (69.4 gallons) | 638 | 13 |
| GLYCERINE 96' TECH | 147 | 12 |
| NORMAL PROPYL ALCOHOL (4.4 gallons) | 29 | 5 |
| SCARLET MOO; ACID RED 73 | * | |

*164.13 grams

The plate wash of the universal system is created by mixing:

| CHEMICAL | POUNDS | OUNCES |
|---|---|---|
| WATER (74 gallons) | 615 | 12 |
| CITRIC ACID | 40 | 13 |
| Mix until dissolved, then add: | | |
| PROPYLENE GLYCOL (14.7 gallons) | 110 | 4 |
| DOWANOL PM | 65 | 8 |
| MAPHOS 8135 | 16 | 5 |
| PHOSPHORIC ACID 85% | 25 | 7 |
| ERIO GLAUCINE A SUPRA Dye | * | |

*2.36 grams

The plate coating of the universal system is created by mixing:

| CHEMICAL | POUNDS | OUNCES |
|---|---|---|
| DEIONIZED WATER (25.0 gallons) | 208 | 4 |
| CITRIC ACID | 23 | 1 |
| DISODIUM PHOSPHATE | 32 | 15 |
| 14 Be; GUM ARABIC (15.8 gallons) | 145 | 7 |
| MAGNESIUM NITRATE SOLN. 66% | 23 | 11 |
| GLYCERINE | 33 | 10 |
| NORMAL PROPYL ALCOHOL (1 gallons) | 6 | 11 |
| KITON BLUE Dye | * | |

*0.41 grams

Thus, although there have been described particular embodiments of the present invention of a universal chemical system for graphic arts printing, it is not intended that such references be construed as limitations upon the scope of this invention except as set forth in the following claims. Further, although there have been described certain specifications used in the preferred embodiment, it is not intended that such be construed as limitations upon the scope of this invention, except as set forth in the following claims.

We claim:

1. A universal chemical system for offset printing comprising:
   a. a plate coating comprising deionized water, citric acid, disodium phosphate, gum arabic, magnesium nitrate solution, glycerine, wherein said glycerine is more concentrated than said gum arabic by 18–45 percent, and propyl alcohol;
   b. a fountain concentrate solution comprising water, citric acid, sodium citrate, disodium phosphate, sodium benzoate, gum arabic, glycerine, 2-ethyl-1,3-hexandiol and a green dye;
   c. an alcohol replacement solution comprising deionized water, diethylene glycol, glycol, glycerine, and propylene glycol methyl ether;
   d. a roller coating comprising deionized water, citric acid, disodium phosphate, gum arabic, glycerine, and propyl alcohol; and
   e. a plate wash comprising water, citric acid, propylene glycol, propylene glycol methyl ether, a surfactant, phosphoric acid, and a glaucine dye.
2. A plate coating comprising:
   a. deionized water;
   b. citric acid;
   c. disodium phosphate;
   d. gum arabic;
   e. magnesium nitrate solution;
   f. glycerine, wherein said glycerine is more concentrated than said gum arabic by 18–45 percent; and
   g. propyl alcohol.
3. A fountain concentrate solution created by the method comprising the steps of:
   a. mixing water, citric acid, sodium citrate, disodium phosphate, and sodium benzoate to form a solution; and
   b. adding gum arabic, glycerine, 2-ethy-1,3-hexandiol, and a green dye to said solution.
4. An alcohol replacement solution comprising:
   a. deionized water;
   b. diethylene glycol;
   c. gycol;
   d. glycerine; and e. propylene glycol methyl ether.

5. A roller coating created by the steps comprising:

a. mixing deionized water, citric acid, and disodium phosphate to form a solution; and b. adding gum arabic, glycerine, and propyl alcohol to said solution.

6. A plate wash created by the steps comprising:

a. mixing water and citric acid to form a solution; and b. adding propylene glycol, propylene glycol methyl ether, a surfactant, phosphoric acid, and a glaucine dye;

c. mixing said solution and said addition until dissolved.

7. A plate coating for graphic arts printing press comprising a mixture of:

a. deionized water;

b. citric acid;

c. disodium phosphate;

d. gum arabic;

e. magnesium nitrate solution;

f. glycerine wherein said glycerine is more concentrated than said gum arabic by 18–45 percent; and g. propyl alcohol.

* * * * *